March 23, 1954   R. S. WOODARD   2,673,104
CLIP
Filed March 12, 1952
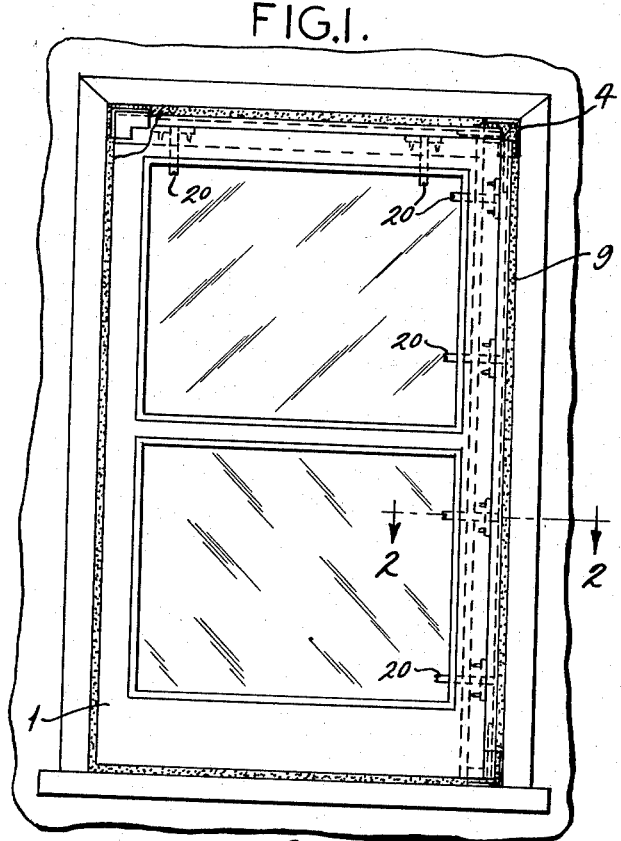
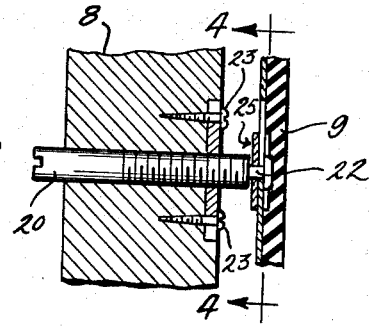
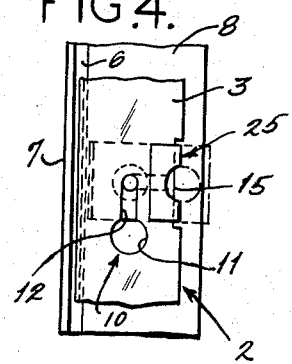
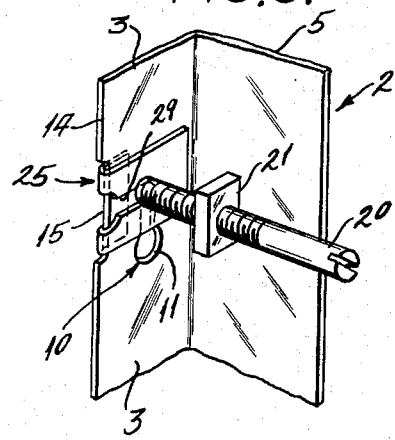
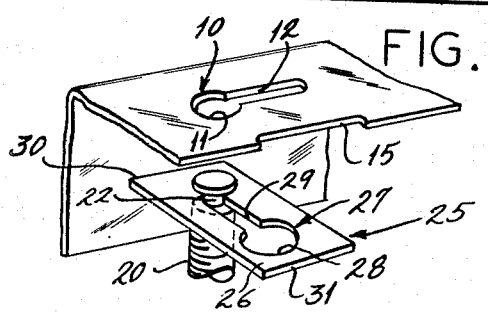
INVENTOR
Roy S. WOODARD
By Bruninga and Sutherland
ATTORNEYS Patented Mar. 23, 1954

2,673,104

UNITED STATES PATENT OFFICE 2,673,104

CLIP

Roy S. Woodard, St. Louis, Mo.

Application March 12, 1952, Serial No. 276,180

5 Claims. (Cl. 287—20)

This invention relates to a clip for securing, within a slot in a web, a member having a peripheral groove; and to the combination of such clip and a web so formed as to anchor the clip in its assembled position. It has particular utility in securing an adjusting screw in a keyhole slot in the head of the movable strip of an adjustable storm sash of the character described in U. S. Patent No. 2,518,969.

Difficulty has been experienced heretofore first in positioning and then in maintaining a series of peripherally grooved members in a corresponding series of slots, especially when the positioning of all of the members must be accomplished simultaneously. For example, in the arrangement shown in Figure 3 of U. S. Patent 2,518,969, the adjusting screws 11 must all be positioned in their respective keyhole slots at one time. While it would appear that by screwing the adjusting screws 11 until the lower shoulders of the grooves 23 of all of them were flush with the side member from which they project, the alignment of the keyhole slots lengthwise of the adjusting screws would be made simple, that is not the case in practice. If the side member or metal strip is warped, even slightly, much difficulty is experienced. Furthermore, if an adjusting screw is not exactly flush, even with an unwarped side member and strip, its keyhole slot either slides over the top of the screw or drops below the level of the groove 23. In either event, one or more of the screws will not properly position, which is a source of annoyance and delay. The thin sheet metal retaining strips 15 must be assembled individually after the adjusting screws are positioned. If those strips are bowed upwardly at their centers, which is liable to happen in the course of their installation, they cannot again conveniently be straightened, so that a gap is produced between the strips and the head upon the outside surface of which they rest. Furthermore, since the principal thrust of the adjusting screw is outward against the head, the retaining strip on the outer side of the head adds nothing to the strength of the assembly in the direction of that thrust, and the edges of the keyhole slot in the head are liable to be bent outwardly even to the extent of allowing the adjusting screw to push through the head.

It is necessary as a practical matter to locate the strip 15 on the outside surface of the head: the limited space between the side member and the head would make installation on the under surface difficult and the open-ended slot in the strip would spring open under the load of the adjusting screw.

One of the objects of this invention is to provide a clip for retaining, within a slot in a web, a peripherally grooved member, which clip may be positioned on either side of the web to strengthen the assembly of clip and web against the principal thrust to be exerted by the peripherally grooved member, and positively to secure said peripherally grooved member with respect to the web.

Another object is to provide such an assembly in which the configuration of the web is such as to anchor the clip in its assembled position.

Another object is to provide such a clip which is cheap, and easy to use.

Other objects will become apparent to those skilled in the art in the light of the following description and accompanying drawing.

In accordance with this invention generally stated a clip is provided by means of which a member is secured within a slot in a web. The member is peripherally grooved to define a neck which is mounted in the slot. The clip takes the form of a plate of bendable material, such as soft steel or aluminium, having a slot with a restricted closed end within which the neck of the member is embraced. A part of the plate opposite the closed end of the slot is bent over an edge of the web. Preferably the edge of the web is so formed as positively to limit movement of the plate and of the peripherally grooved member with respect to the web.

When the web is one leg of an angle bar, and the plate is positioned on the inside surface of the web, the plate may be so dimensioned as to prevent cocking of the plate and to guide the web with respect to the peripherally grooved member in assembling the web and peripherally grooved member.

In the drawing:

Figure 1 is a view in front elevation of an adjustable storm sash, adjusting screws of which are secured in the head of a movable strip in accordance with one embodiment of this invention;

Figure 2 is a sectional view taken along the line 2—2 of Figure 1;

Figure 3 is a sectional view taken along the line 3—3 of Figure 2;

Figure 4 is a sectional view taken along the line 4—4 of Figure 3;

Figure 5 is a view in perspective showing an assembly of web, clip and peripherally grooved adjusting screw; and Figure 6 is a view in perspective of the adjusting screw, web and plate of the device shown in Figure 5 in the process of assembly.

Referring now to the drawing for an illustrative embodiment of this invention 1 represents an adjustable storm sash provided with movable strips 2 along the top and one side of the sash. At the corners of the sash, and particularly at that corner at which the strips 2 meet, a flanged corner plate 4 fills any gap resulting from the outward movement of the strips. Each movable strip 2 is an angle bar having a head 3 and a depending leg 5. The depending leg 5 slides in a kerf 6 defined by a metal trim 7 and a surface of the sash frame 8. The head of the movable strip 2 is faced on its outside surface with a strip 9 of hard felt or the like. Oriented lengthwise of, and spaced along the head 3 are keyhole slots 10 each having an enlarged portion 11 and a restricted portion 12. In the embodiment shown the free edge 14 of the head 3 is provided with a recess 15 adjacent each keyhole slot 10.

Extending through holes in a side member of the frame 8 and spaced from one another at distances equal to the distances between corresponding keyhole slots in the head 3 are adjusting screws 20. The adjusting screws 20 are in threaded engagement with an internally threaded member 21 which in the embodiment shown in Figure 5 is simply a square nut set into the outer side of the sash frame 8 and held in place by screws 23. The adjusting screw 20 is provided near its outer end with a peripheral groove defining a neck 22.

A clip 25 serves to secure the adjusting screw 20 in the keyhole slot 10. In the embodiment shown the clip 25 consists of a rectangular plate 26 provided with a keyhole slot 27 extending along the long axis of the rectangular plate. The keyhole slot 27 has an enlarged portion 28 sufficiently wide to admit the end of the adjusting screw 20 and a restricted portion 29 narrower than the parts of the adjusting screw lying on either side of the groove 22 but wide enough to admit the neck 22. The keyhole slot 27 is so positioned in the plate 26 that the distance from the closed end of the restricted portion 29 of the keyhole slot to the edge 30 of the plate is only slightly less than the closest distance between the inside wall of the groove 22 and the junction of the depending leg 5 with the head 3 when the adjusting screw is in its assembled position as shown in Figure 5. Further, the distance from the closed end of the restricted portion 29 to the opposite edge 31 of the plate is sufficiently great to allow the plate 26 to be bent over the edge 14 of the head 3 within the recess 15 when the adjusting screw is in its assembled position as shown in Figure 5.

In assembling the adjusting screws, movable strip and clips (which will be illustrative of the use of such a clip generally) the enlarged portion 28 of the keyhole slot of a plate 26 is slipped over the outer end of each adjusting screw 20 (after the adjusting screw is in place in the frame 8 along one edge of the sash) until the groove of the adjusting screw is aligned with the restricted portion 29 of the keyhole slot. The plate 26 is then shifted lengthwise so that the neck 22 is slid into the restricted portion of the keyhole slot as far as it will go as shown in Figure 6. All of the plates 26 are oriented with their edges 30 parallel with the kerf 6. The depending leg 5 of the strip 2 is slid into the kerf 6. The head 3 of the movable strip 2 is then positioned over the outer ends of the adjusting screws in such a way that the enlarged portion 11 of the keyhole slots 10 lies directly over the outer ends of the adjusting screws 20. The keyhole slots 10 in the head 3 lie substantially at right angles to the keyhole slots 27 of the plates 25. The head 3 is then moved toward the sash to permit the ends of the adjusting screw to pass through the enlarged portions 11 of the keyhole slots 10. The restricted portions 12 of the keyhole slots 10 are automatically aligned with the grooves of the adjusting screws 20 when the underside of the head 3 is firmly in contact with the plate 26. Any movement beyond that alignment is prevented by the abutment of the plate 26 against the lower radial shoulder of the groove. The strip 2 is now moved lengthwise in such a direction that the neck 22 is embraced by the restricted portion of the keyhole slot 10. Because of the fact that the distance of the closed end of the restricted portion of the keyhole slot 26 is only slightly less than the distance between the nearest portion of the neck 22 and the junction of the depending leg 5 and the head 3, the plate 26 cannot cock during the lengthwise movement of the strip 2. When the strip 2 has reached its desired position with respect to the sash frame 8 (which position should correspond substantially to a position of the adjusting screw neck at the closed end of the restricted portion 12 of the keyhole slot 10) the plate 26 is positioned within the boundaries of the recess 15. The end of the plate 26 which projects beyond the recessed edge of the head is now bent over that edge within the recess. The bending process for which a pair of pliers suffices, will tend to pull the plate tight against the neck 22. At the same time the two lateral edges of the recess 15 form shoulders against which the clip will butt if there is any tendency for the strip 2 to move with respect to the adjusting screws. It can be seen that the inner radial shoulder of the groove, through which the principal thrust of the adjusting screw will be exerted is now supported on three sides with a double thickness of metal. The opening on the fourth side is backed with a single thickness of metal and is open through a distance less than the outside diameter of the shoulder so that an extremely strong, rigid construction results. The provision of a totally enclosed keyhole slot in the clip plate makes for added strength. It is practically impossible for the sides of the keyhole slot to be spread without rupturing the material of which the plate is made. Bending or puckering of the head under the thrust of the adjusting screws is eliminated for all practical purposes.

The adjusting screw and head are locked against displacement with respect to one another in any direction.

It can be seen that the use of the clip is not confined to an angle bar. The clip may be used with other members having a slot and an edge spaced therefrom, and the term web is used to indicate any such member.

It can also be seen that the clip can be positioned on either side of a web. Though in the illustrative example described a large part of its utility would be lost by positioning the clip on the outside surface of the head, if the principal thrust were to be delivered in a direction from the outside inwardly there would be reason to put the clip on the outside surface.

The groove of the peripherally grooved member may be defined by a pair of collars or the like, and the peripherally grooved member itself may be part of or attached to any form of device such as a hook or baffle or other structural member.

Numerous other variations within the scope of the appended claims will occur to those skilled in the art in the light of the foregoing description.

Thus it can be seen that a cheap, easily manufactured and efficient device is provided for maintaining a peripherally grooved member in a slot in a web having an edge spaced therefrom.

Having thus described my invention what is claimed and desired to be secured by Letters Patent is:

1. In combination, an angle bar having a head and a leg, said head having a free edge along its length and a keyhole slot in said head and extending lengthwise of said angle bar; an adjusting screw having a shank, said shank being peripherally grooved to define a neck, the keyhole slot in said head having an enlarged portion of a size to admit said shank and a reduced portion of a size to admit only said neck, said neck being mounted within said reduced portion; and a clip, serving to maintain the neck of the shank of the adjusting screw within the reduced portion of said keyhole slot, said clip having a keyhole slot with an enlarged portion of a size to admit the shank of the adjusting screw and a reduced portion of a size to admit only the neck of said adjusting screw, said neck being embraced within said reduced portion, and an end of said clip adjacent the enlarged portion being bent over the free edge of said head.

2. In combination, an angle bar having a head and a leg, said head having a free edge along its length and a keyhole slot extending lengthwise thereof; an adjusting screw having a shank, said shank being peripherally grooved to define a neck, the keyhole slot in said head having an enlarged portion of a size to admit said shank and a reduced portion of a size to admit only said neck, said neck being mounted within said reduced portion; and a clip, serving to maintain the neck of the shank of the adjusting screw within the reduced portion of said keyhole slot, said clip having a keyhole slot with an enlarged portion of a size to admit the shank of the adjusting screw and a reduced portion of a size to admit only the neck of said adjusting screw, said neck being embraced within said reduced portion, the neck-embracing part of said clip immediately overlying the inner side of the head and extending along and closely adjacent the leg of said angle bar and part of said clip being bent over the free edge of said head.

3. The combination of claim 1 wherein the free edge of the head is provided with a recess in such a position with respect to the keyhole slot in said head that the part of the clip which is bent over the free edge is within the said recess.

4. In combination, a web having a free edge and a keyhole slot; a member, peripherally grooved to define a neck portion intermediate two shoulders, the keyhole slot in said web having an enlarged portion of a size to admit said member and a reduced portion of a size to admit only said neck portion, said neck portion being mounted within said reduced portion; and a clip, serving to maintain the neck portion within the reduced portion of said keyhole slot, said clip having a slot, restricted at a closed end thereof to admit only the said neck portion, said neck portion being embraced within said restricted slot at said closed end and a part of said clip adjacent the opposite end of said slot being bent over the free edge of said web.

5. In combination, a web having a free edge and a slot with a restricted portion at a closed end thereof; a member, peripherally grooved to define a neck portion intermediate two shoulders, the restricted portion of the slot in said web being of a size to admit only said neck portion, said neck portion being mounted within said restricted portion; and a clip, serving to maintain the neck portion within the restricted portion of said slot, said clip having a slot, restricted at a closed end thereof to admit only the said neck portion, said neck portion being embraced within said restricted slot at said closed end and a part of said clip adjacent the opposite end of said slot being bent over the free edge of said web.

ROY S. WOODARD.

References Cited in the file of this patent

UNITED STATES PATENTS

| Number | Name | Date |
| --- | --- | --- |
| 1,702,937 | Friedemann | Feb. 19, 1929 |
| 1,816,694 | Pope | July 28, 1931 |
| 2,381,129 | Lind | Aug. 7, 1945 |